Oct. 11, 1955

L. E. ZERLAUT 2,720,244

WRAPPING MACHINE

Filed Jan. 29, 1953

INVENTOR.
LEONARD E. ZERLAUT
BY
*Lyon + Lyon*
ATTORNEYS

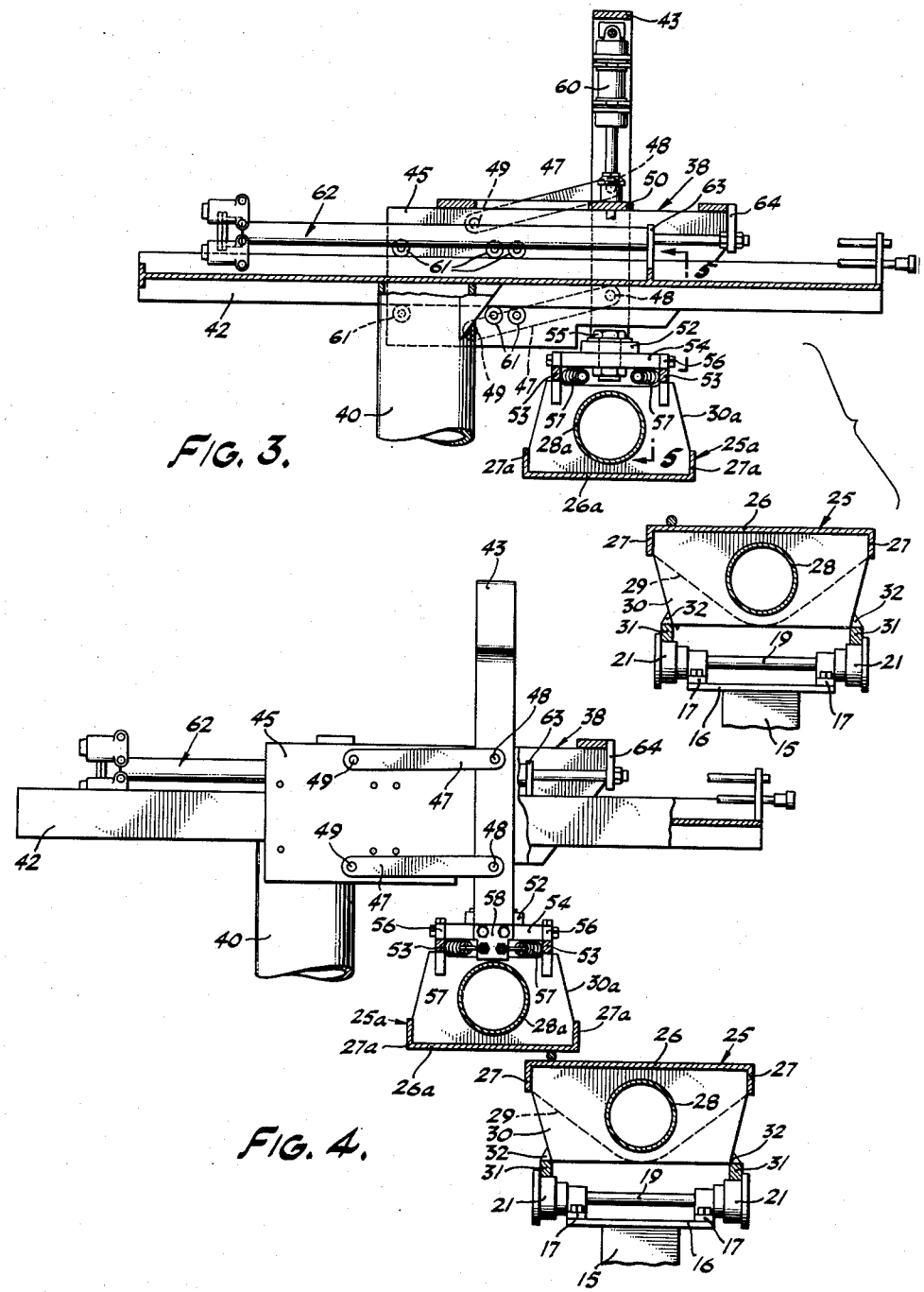

Oct. 11, 1955

L. E. ZERLAUT 2,720,244

WRAPPING MACHINE

Filed Jan. 29, 1953

INVENTOR.
LEONARD E. ZERLAUT
BY
Lyon & Lyon
ATTORNEYS

United States Patent Office 2,720,244
Patented Oct. 11, 1955

2,720,244

WRAPPING MACHINE

Leonard Elvin Zerlaut, Santa Ana, Calif., assignor to Narmco, Inc., San Diego, Calif., a corporation of California Application January 29, 1953, Serial No. 333,939

14 Claims. (Cl. 154—1.8)

This invention relates to a machine for forming tubular bodies.

Tubular bodies of high strength are now widely employed in the manufacture of fishing rods, structural bodies, and the like. A particularly suitable material from which such bodies are formed, and one which is currently in common use, is a high strength material of glass fibre cloth, reinforced with a resinous binder. A sheet of such cloth, properly shaped, is convolutely wrapped about a mandrel. The article is then cured or heat treated so that the resinous binder material which normally is thermosetting becomes a strong adhesive, causing adherence of the adjacent layers of material. The mandrel is then removed and the tubular structure finished for its desired purpose. A critical step in the formation of such a tubular member is the rolling or wrapping of the material about the mandrel. The variables, pressure, wrapping action, contact area between the wrapping machine and the article to be wrapped and the permitted movement of the article during wrapping, must each be carefully regulated to insure the desired strength and also uniformity of product. The present invention is directed to a machine for controlling these variables to produce rods or tubes of maximum strength and uniform characteristics, and which is flexible as to size of product and adaptable to produce cylindrical as well as tapered articles.

Accordingly, it is a principal object of the present invention to provide a machine for wrapping material about a mandrel to form rods or tubes.

It is a further object of this invention to provide such a machine, the wrapping operation of which can be readily regulated to permit production of wrapped articles of maximum strength and uniform characteristics.

It is still a further object of this invention to provide such a machine which will wrap both cylindrical and tapered articles.

It is another object of this invention to provide such a machine which is flexible in operation as regards the size and nature of the article to be wrapped.

It is still another object of this invention to provide such a machine which will operate efficiently and economically.

Other objects and advantages of the invention will be apparent during the course of the following description.

In the accompanying drawings, in which like numerals are employed to designate like parts throughout the same, Fig. 1 is a front perspective view of a preferred embodiment of a machine constructed in accordance with the invention.

Fig. 3 is a view taken along line 3—3 of Fig. 1.

Fig. 4 is a view substantially the same as Fig. 3, except that the upper mandrel is lowered upon the bottom mandrel.

Figure 1:
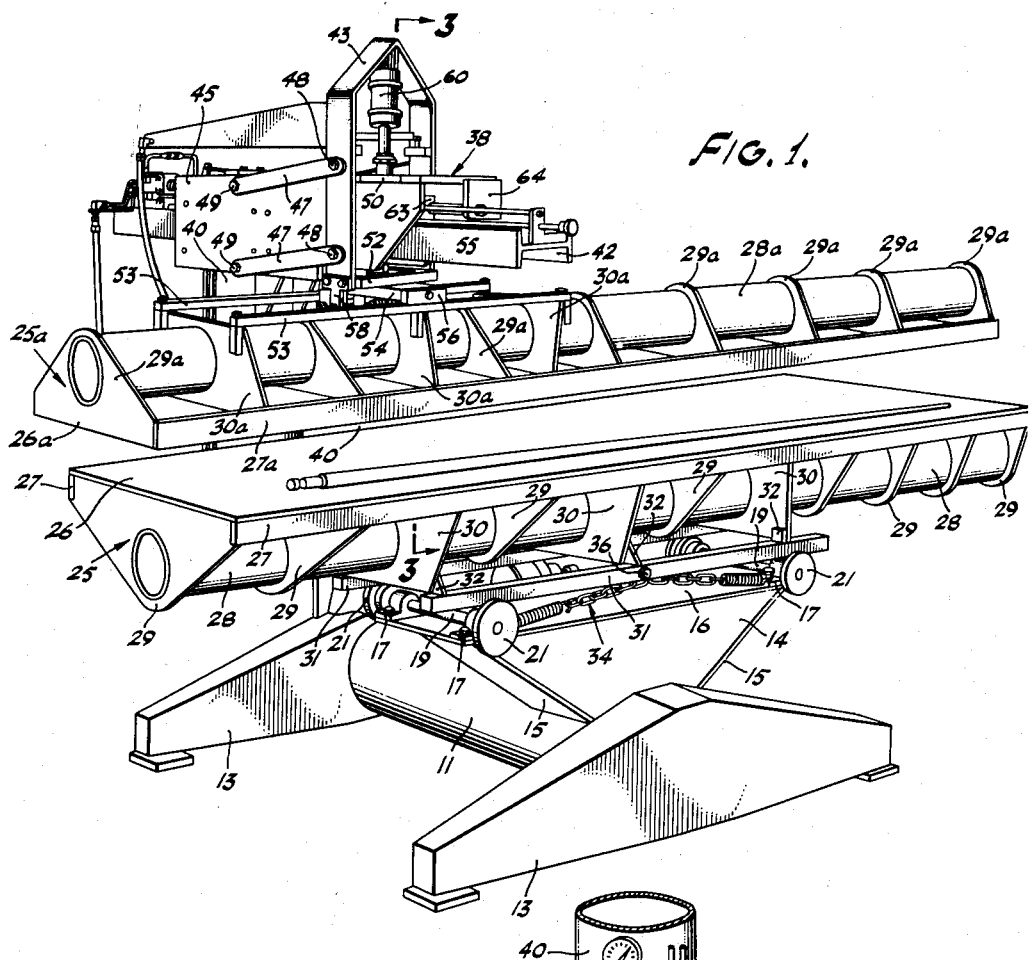

Referring to the figures, the support or frame mechanism of the machine will first be described. The numeral 11 designates a cylindrical oil reservoir which is connected, as by welding, at each end thereof to support footings 13. The oil reservoir 11 acts as a support for a framework which consists of a triangular plate 14 and two side plates 15, joined together, as by welding, to form an integral support. This framework carries a horizontal plate 16. Bolted to the horizontal plate 16 at each of the corners thereof, are four brackets 17, in each adjacent pair of which is journaled an axle 19. The axles 19 carry stepped wheels 21, as seen. The stepped wheels 21 are utilized to carry the lower platen generally designated as 25, which will now be described. The lower platen 25 consists of a horizontal face plate 26 from which depend transversely extending flanges 27. Face plate 26 is supported by means of a structural member 28. This member 28, while shown in hollow cylindrical form, may be of any desired shape. A series of webs 29 are connected to the face plate 26 and the flanges 27. The structural member 28 is inserted in such webs and rigidly connected thereto, with the result that the webs 29 support the face plate 26 on the structural member 28. In addition, a series of webs 30 are utilized to carry a pair of guide rails 31, each of the guide rails 31 being secured to the webs 30, as by welding. To strengthen the connection between the guide rails 31 and the webs 30, it has been found desirable to employ small auxiliary welding plates 32, as seen. As best seen in Fig. 1, guide rails 31 ride upon the inner smaller step of the stepped wheels 21.

Attached to each of the two front brackets 17 is a spring and chain assembly 34. The two spring and chain assemblies 34 are connected and are attached to the guide rail 31 at 36. As is apparent, the guide rails 31, by riding upon the inner step of the stepped wheels 21, permit transverse movement of the entire lower platen assembly. Such movement is, however, restricted by the spring force of the chain and spring assemblies 34 which are kept under tension for that purpose As will be described hereinafter, the restricted transverse movement of the lower platen appreciably contributes to the uniformity of the wrapping action of the machine, particularly where tapered articles are being wrapped.

With the customary type materials employed, it has been found highly desirable to heat the material as it is being wrapped in order to render the same tacky and also more flexible, thereby insuring an adequate preliminary bonding of the layers of material. To this end, heating elements, such as rods or coils, are disposed in the lower platen directly beneath the face plate 26. These may be of conventional design and need not, therefore, be further described. For efficient heating, it is also desirable to enclose the lower portion of the lower platen 25 with an insulating jacket extending from the flanges 27 about the webs 29. For clarity of illustration in the figures, such a jacket is not shown. Moreover, in addition it has been found desirable to cover the face plate 26 with a material such as canvas, which provides both a cushioning action and prevents sliding of the material during the wrapping operation.

As will be further described herein, the customary method of utilizing the subject machine consists of cutting to the desired shape the material to be wrapped, laying such material upon the lower platen and placing a mandrel of the desired shape and thickness on the material. One edge of the material is secured temporarily to the mandrel by heat treatment, as by running a heated iron over the material edge as that edge is placed in contact with the mandrel. Next, the upper platen is lowered so as to contact the mandrel, following which the upper platen is brought forward so as to roll the mandrel and thereby wrap the material about the mandrel.

Figure 2:
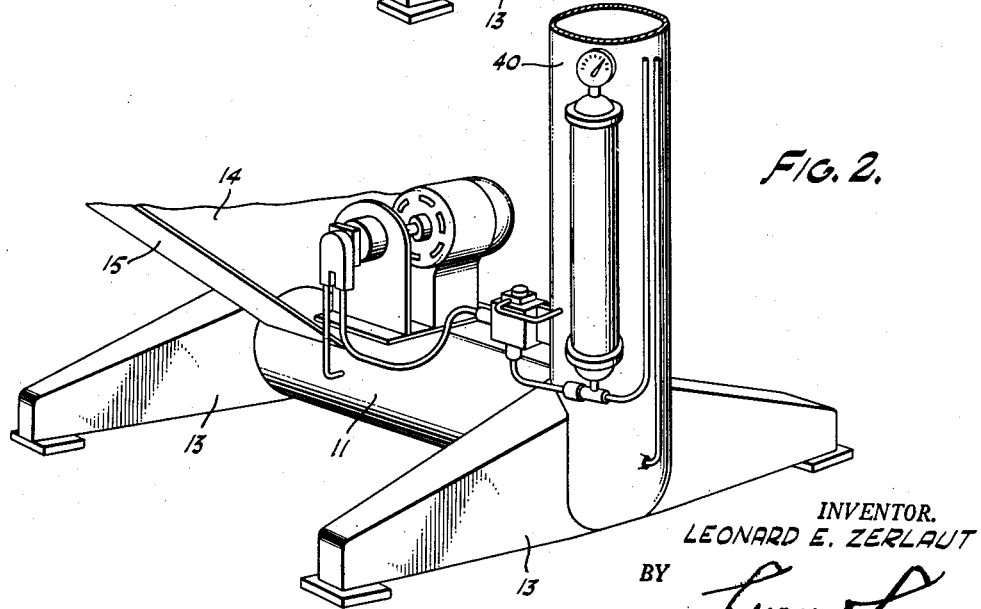
Fig. 2 is a perspective view of a lower portion of the machine shown in Fig. 1, as viewed from the rear thereof.

The details of the upper platen and its associated components will now be described. The upper platen, generally designated as 25a, is substantially identical in design to the lower platen 25, being also preferably covered by canvas. It consists of a horizontal face plate 26a having vertical flanges 27a connected thereto. A structural member 28a extends substantially the full length of the face plate 26a and carries face plate 26a by means of a series of webs 29a. The upper platen 25a is supported by a carriage assembly generally designated 38, which will now be described. As best seen in Fig. 2, secured to the rear footing 13, as by welding, is a vertical support member 40. This support member is preferably of hollow cylindrical construction and is open to the cylindrical oil reservoir 11, with the result that in addition to supporting the carriage assembly 38, it serves as an additional oil reservoir for the hydraulic mechanism to be later described.

Welded to the top portion of the vertical support member 40 is a horizontal carriage supporting bar 42. This horizontal carriage supporting bar is preferably of I-beam construction as shown, although other forms may be employed. The carriage includes a steeple member 43. Two vertical side supports 45 are disposed within the lower portion of the inner side of each leg of the steeple member 43. The steeple member 43 is connected at each leg to a vertical side support by means of a pair of links 47, each of which is pivotally connected at one end to a leg of the steeple 43, as at 48, and pivotally connected to the vertical side supports 45 at the other end, as at 49. A transverse horizontal plate 50 is connected as by welding to the two vertical side supports 45.

Figure 6:
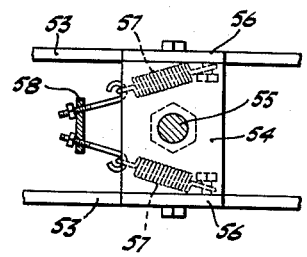
Fig. 6 is a view taken along the line 6—6 of Fig. 5.

Rigidly mounted across the lower ends of the steeple member 43 is a lower cross piece 52, secured to the ends of the steeple as by bolts. As will now be described, this lower cross piece 52 carries the upper platen 25a in such manner as to permit limited rotation thereof in a horizontal plane. Thus, a pair of transverse supporting rails 53 are rigidly secured to the upper platen 25a, being bolted or welded to webs 30a. Secured to each rail 53 at the center thereof is a block 56. A cross support bar 54 is provided to which these blocks are bolted in such manner as to permit rotatable movement in a vertical plane of the rails and hence the platen with respect to bar 54. In addition, bar 54 is carried by lower cross piece 52, being bolted thereto by bolt 55 in such manner as to permit rotatable movement in a horizontal plane of bar 54 and hence the platen with respect to cross piece 52. Such bolt connection permits limited rotation of the upper platen 25a in a horizontal plane. To restrain this rotation, a pair of springs 57, best seen in Fig. 6, is provided. One end of each of these springs is connected to an extension bracket 58 which depends from the left hand leg of steeple 43. The remaining end of one of springs 57 is connected to one of the transverse supporting rails 53, whereas the remaining end of the other spring 57 is connected to the other transverse supporting rail 53. These springs 57 are placed under some initial tension, with the result that they will oppose rotation of the upper platen 25a.

While several expedients may be employed for raising and lowering the upper platen 25a, a satisfactory means is by a hydraulic ram 60 connected at one end to the apex of the steeple 43. The piston end of the ram is secured to the transverse plate 50. As is apparent from Fig. 1, the action of ram 60 will raise and lower the steeple 43 and with it the upper platen 25a. Such motion is made possible by the pivotal connections of the links 47 to the steeple and vertical side supports 45, at 48 and 49.

Figure 7:
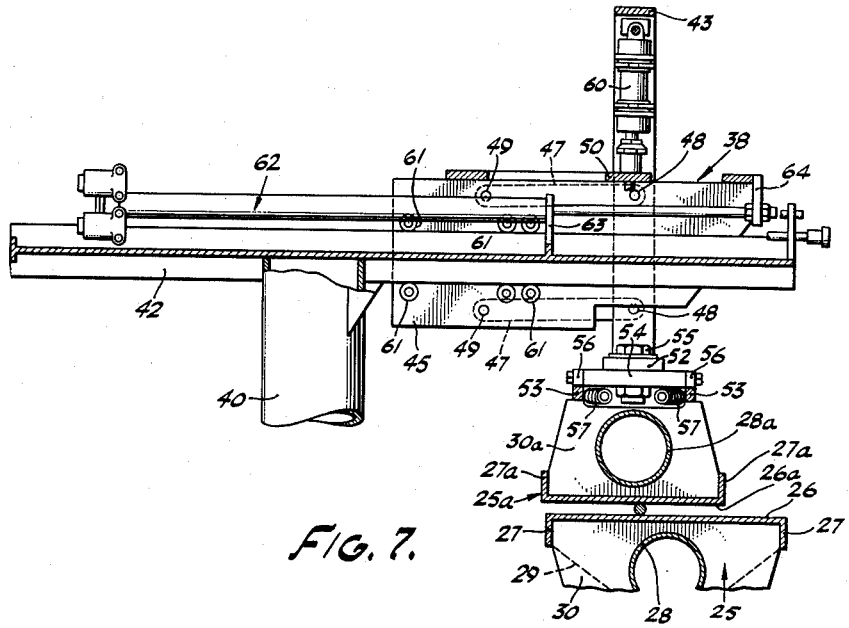
Fig. 7 is a view substantially the same as Fig. 4, showing the machine at a different operating position.
Figure 5:
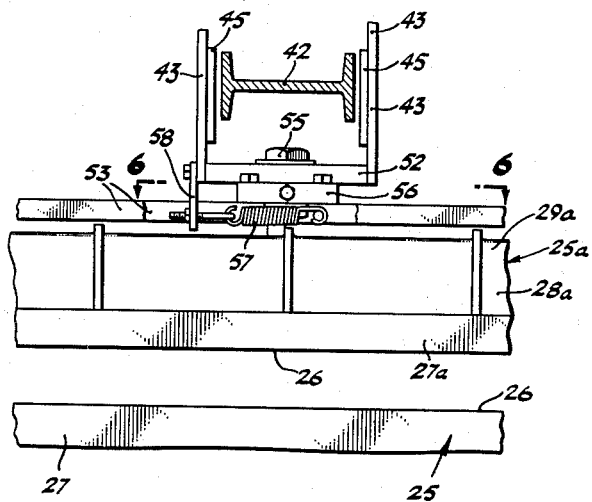
Fig. 5 is a view taken along the line 5—5 of Fig. 3.

To provide forward and backward motion of the carriage assembly 38, a series of rollers 61 carried by the vertical side supports 45 are provided, the rollers being rotatably secured to the side supports by bolts, as seen. These rollers ride upon the upper and lower portions of the horizontal carriage supporting bar 42. As best seen in Fig. 7, a horizontal cylinder and piston assembly, generally indicated as 62, is integrally connected at the forward end of the cylinder to a bracket 63 which is secured to the upper surface of horizontal carriage supporting bar 42. The piston shaft acts against a cross plate 64 which is integrally connected to the forward edge of a vertical side support 45. The action of the ram 62 will be to force the entire carriage assembly 38 forward and backward. This, of course, will result in a forward and backward motion of the upper platen 25a.

For the sake of clarity, many of the various component parts of the hydraulic system employed, such as valves, tubes, controls, accumulators, manifolds, and the like, have not been described, and some have been omitted from the drawings. This has been done to simplify and clarify the description and drawings of the invention, since these components are of conventional design. Moreover, while it has been found that hydraulic motivation is to be preferred in the present invention, it is to be understood that other forms, such for example as electrical, may be used.

As above described, the lower platen 25 remains motionless, with the exception that restrained transverse movement is possible. On the other hand, the upper platen may move backward and forward in response to the action of the ram 62, and up and down in response to the action of the ram 60, that is, perpendicular to the lower platen. Moreover, rotational movement of the upper platen is permitted about both a vertical and a horizontal axis.

The operation of the machine will now be described. First, the upper platen 25a is disposed upwardly and rearwardly by the action of cylinders 60 and 62. Thus, by means of suitable controls, hydraulic fluid is applied to the cylinder 60. Since the piston of this cylinder acts against transverse plate 50, which is fixed insofar as vertical movement is concerned, the ram will force the steeple 43 upwardly, carrying with it the upper platen 25a. Similarly, fluid is applied to the forward portion of the cylinder and piston assembly 62, causing the vertical side supports 45 to move backwardly as permitted by the rollers 61. The machine is then in the position shown in Fig. 3. Next, the operator places a sheath of material upon the face of the lower platen 25, and as previously described, secures to the edge thereof a mandrel. The mandrel is disposed toward the rear of the machine, the free portion of the sheath extending toward the front of the machine. Next, by means of a suitable control, fluid in the vertical ram 60 is discharged, causing the upper platen 25a to descend into contact with the mandrel, which position is illustrated in Fig. 4. To obtain uniform wrapping, the pressure applied by the upper platen 25a must be uniform along the entire length of the mandrel. Where a simple cylindrical form is desired, this is accomplished simply by having the upper and lower platens parallel. It is frequently desirable, however, to wrap tapered structures. In this event, it is necessary that the upper platen 25a conform to the angle of the taper. This is made possible by means of the pivotal connection between blocks 56 and support bar 54. To insure uniform pressure, the center of the mandrel should be disposed approximately at the longitudinal center of the upper platen. If it is desired to wrap a relatively short length, but one having such a taper that the downward end of the upper platen would contact the corresponding end of the lower platen before the upper platen can conform to the angle of taper, this difficulty can be easily remedied by simply placing an elevated platform on the lower platen 25, thereby spacing the upper platen a greater distance therefrom.

After the upper platen has been brought into pressure engagement with the mandrel, a further control is activated, causing fluid to flow to the proper portion of the cylinder of the assembly 62 to drive the upper platen forwardly. This action, illustrated in Fig. 7, rotates the mandrel, thereby wrapping the sheath of material.

When wrapping tapered structures, in order to obtain a uniform wrapping action, it is necessary that the upper platen be permitted to rotate about a central vertical axis. This is essential since that portion of the upper platen in contact with the thick end of the mandrel will necessarily tend to move a greater distance than that portion of the upper platen which contacts the small end of the mandrel. This rotation is made possible by pivotal connection 55 heretofore described. Springs 57 are provided to return the upper platen to its initial line position following each wrapping operation.

In addition to the requirement for rotation about a vertical axis of the upper platen, an additional requirement is necessary when winding tapered mandrels in that the travel of the tapered mandrel over the lower platen will not be a straight path but rather an arc. The result is that in order to avoid slipping of the mandrel relative to one or the other of the platens, and consequent wrinkling and weakening of the structure, it is essential that means be provided for transverse movement of one platen with respect to the other. This is accomplished by means of the construction of the support of the lower platen heretofore described. Thus, the lower platen is free to move transversely over the stepped wheels 21. The chain and spring assemblies 34 are included to return the lower platen to its initial central position at the completion of the operation.

Following the winding operation above described, the wrapped mandrel is removed from the machine and further processed to complete the finished article. Such processing normally includes curing, removal of the mandrel and finishing of the surface of the article.

In the operation above described, it will be noted that to wrap the material about the mandrel, the upper platen is first moved downwardly, only until it has come into contact with the entire length of the mandrel. After such contact is made, the upper platen is moved forwardly to wind the material about the platen. This two-step operation has been found to be very greatly preferred, although for some applications the downward and forward motions could occur simultaneously, that is, the assembly 62 and the horizontal ram 60 activated together, thereby providing a simpler single-step operation. One difficulty with such single-step operation is, however, that the upper platen will tend to wrap the mandrel immediately upon contact, with the result that since such platen will first contact the thick portion of the mandrel before contacting the thin portion thereof, no pressure will be applied to the thin portion of the mandrel during the initial wrapping stage. The result is undesirable non-uniformity.

While the features of the machine above described, that is, the permitted rotation of the upper platen about both a vertical and a horizontal axis and the permitted transverse movement of the lower platen, are particularly advantageous when tapered structures are being wound, it has also been found that these features are desirable where cylindrical structures are wound. This results from the fact that the platens are capable of adjusting themselves to non-uniformities in either the material or the mandrels, thereby minimizing strength weaknesses and non-uniformity of the finished product which would otherwise result therefrom.

While there has been described what is at present considered the preferred embodiment of the present invention, it will be appreciated by those skilled in the art that various changes and modifications can be made therein without departing from the essence of the invention, and it is intended to cover all such changes and modifications as come within the true spirit and scope of the appended claims.

I claim:

1. A machine for forming tubular bodies including a frame, two platens, one disposed above the other, means secured to said frame for carrying one of said platens to permit transverse movement thereof in a horizontal plane, additional means secured to said frame for carrying the other of said platens to permit rotatable movement thereof about both a horizontal and a vertical axis, means for raising and lowering one of said platens with respect to the other, and additional means for moving one of said platens with respect to the other in a horizontal plane at a direction generally perpendicular to said transverse movement.

2. A machine for forming tubular bodies including a frame, two platens, one disposed above the other, means secured to said frame for carrying one of said platens to permit transverse movement thereof in a horizontal plane, restraining members connected to said means and tending to restrain said platen against such transverse movement, additional means secured to said frame for carrying the other of said platens to permit rotatable movement thereof about both a horizontal and a vertical axis, means for raising and lowering one of said platens with respect to the other, and additional means for moving one of said platens with respect to the other in a horizontal plane at a direction generally perpendicular to said transverse movement.

3. A machine for forming tubular bodies including a frame, two platens, one disposed above the other, means secured to said frame for carrying one of said platens to permit transverse movement thereof in a horizontal plane, additional means secured to said frame for carrying the other of said platens to permit rotatable movement thereof about both a horizontal and a vertical axis, restraining members connected to said additional means and tending to restrain said other platen against rotatable movement about a vertical axis, means for raising and lowering one of said platens with respect to the other, and additional means for moving one of said platens with respect to the other in a horizontal plane at a direction generally perpendicular to said transverse movement.

4. A machine for forming tubular bodies including a frame, two platens, one disposed above the other, means secured to said frame for carrying one of said platens to permit transverse movement thereof in a horizontal plane, restraining members connected to said means and tending to restrain said platen against such transverse movement, additional means secured to said frame for carrying the other of said platens to permit rotatable movement thereof about both a horizontal and a vertical axis, additional restraining members connected to said additional means and tending to restrain said other platen against rotatable movement about a vertical axis, means for raising and lowering one of said platens with respect to the other, and additional means for moving one of said platens with respect to the other in a horizontal plane at a direction generally perpendicular to said transverse movement.

5. A machine for forming tubular bodies including a frame, a lower platen, means secured to said frame for carrying said lower platen to permit transverse movement thereof, an upper platen, means secured to said frame for carrying said upper platen to permit rotatable movement thereof about both a horizontal and a vertical axis, means for raising and lowering one of said platens with respect to the other, and additional means for moving one of said platens with respect to the other in a horizontal plane at a direction generally perpendicular to said transverse movement.

6. A machine for forming tubular bodies including a frame, a lower platen, means secured to said frame for carrying said lower platen to permit transverse movement thereof, an upper platen, means secured to said frame for carrying said upper platen to permit rotatable movement thereof about both a horizontal and a vertical axis, means for raising and lowering said upper platen, and additional means for moving one of said platens with respect to the other in a horizontal plane at a direction generally perpendicular to said transverse movement.

7. A machine for forming tubular bodies including a frame, a lower platen, means secured to said frame for carrying said lower platen to permit transverse movement thereof, an upper platen, means secured to said frame for carrying said upper platen to permit rotatable movement thereof about both a horizontal and a vertical axis, means for raising and lowering said upper platen, and additional means for moving said upper platen in a horizontal plane at a direction generally perpendicular to said transverse movement.

8. A machine for forming tubular bodies including a frame, a lower platen, means secured to said frame for carrying said lower platen to permit transverse movement thereof, an upper platen, means secured to said frame for carrying said upper platen to permit rotatable movement thereof about both a horizontal and a vertical axis, means for raising and lowering one of said platens with respect to the other, and additional means for moving said upper platen in a horizontal plane at a direction generally perpendicular to said transverse movement.

9. A machine for forming tubular bodies including a frame, a lower platen, means secured to said frame for carrying said lower platen to permit transverse movement thereof, restraining members connected to said means and tending to restrain said platen against such transverse movement, an upper platen, means secured to said frame for carrying said upper platen to permit rotatable movement thereof about both a horizontal and a vertical axis, means for raising and lowering one of said platens with respect to the other, and additional means for moving one of said platens with respect to the other in a horizontal plane at a direction generally perpendicular to said transverse movement.

10. A machine for forming tubular bodies including a frame, a lower platen, means secured to said frame for carrying said lower platen to permit transverse movement thereof, an upper platen, means secured to said frame for carrying said upper platen to permit rotatable movement thereof about both a horizontal and a vertical axis, restraining members connected to said last mentioned means and tending to restrain said upper platen against rotatable movement about a vertical axis, means for raising and lowering one of said platens with respect to the other, and additional means for moving one of said platens with respect to the other in a horizontal plane at a direction generally perpendicular to said transverse movement.

11. A machine for forming tubular bodies including a frame, a lower platen, means secured to said frame for carrying said lower platen to permit transverse movement thereof, restraining members connected to said means and tending to restrain said platen against such transverse movement, an upper platen, means secured to said frame for carrying said upper platen to permit rotatable movement thereof about both a horizontal and a vertical axis, restraining members connected to said last mentioned means and tending to restrain said upper platen against rotatable movement about a vertical axis, means for raising and lowering one of said platens with respect to the other, and additional means for moving one of said platens with respect to the other in a horizontal plane at a direction generally perpendicular to said transverse movement.

12. A machine for forming tubular bodies including a frame, a lower platen, means secured to said frame for carrying said lower platen to permit transverse movement thereof, restraining members connected to said means and tending to restrain said platen against such transverse movement, an upper platen, means secured to said frame for carrying said upper platen to permit rotatable movement thereof about both a horizontal and a vertical axis, restraining members connected to said last mentioned means and tending to restrain said upper platen against rotatable movement about a vertical axis, means for raising and lowering said upper platen, and additional means for moving one of said platens with respect to the other in a horizontal plane at a direction generally perpendicular to said transverse movement.

13. A machine for forming tubular bodies including a frame, a lower platen, means secured to said frame for carrying said lower platen to permit transverse movement thereof, restraining members connected to said means and tending to restrain said platen against such transverse movement, an upper platen, means secured to said frame for carrying said upper platen to permit rotatable movement thereof about both a horizontal and a vertical axis, restraining members connected to said last mentioned means and tending to restrain said upper platen against rotatable movement about a vertical axis, means for raising and lowering one of said platens with respect to the other, and additional means for moving said upper platen in a horizontal plane at a direction generally perpendicular to said transverse movement.

14. A machine for forming tubular bodies including a frame, a lower platen, means secured to said frame for carrying said lower platen to permit transverse movement thereof, restraining members connected to said means and tending to restrain said platen against such transverse movement, an upper platen, means secured to said frame for carrying said upper platen to permit rotatable movement thereof about both a horizontal and a vertical axis, restraining members connected to said last mentioned means and tending to restrain said upper platen against rotatable movement about a vertical axis, means for raising and lowering said upper platen, and additional means for moving said upper platen in a horizontal plane at a direction generally perpendicular to said transverse movement.

References Cited in the file of this patent

UNITED STATES PATENTS

| | | |
|---|---|---|
| 2,406,033 | Perkins | Aug. 20, 1946 |
| 2,424,450 | Bogoslowsky | July 29, 1947 |
| 2,431,342 | Perkins | Nov. 25, 1947 |